(12) United States Patent
Blackmon et al.

(10) Patent No.: US 7,505,366 B1
(45) Date of Patent: Mar. 17, 2009

(54) METHOD FOR LINEAR OPTOACOUSTIC COMMUNICATION AND OPTIMIZATION

(75) Inventors: Fletcher A. Blackmon, Forestdale, MA (US); Lee E. Estes, Mattapoisett, MA (US); Gilbert Fain, East Freetown, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 159 days.

(21) Appl. No.: 11/454,457

(22) Filed: Jun. 16, 2006

(51) Int. Cl.
*H04B 11/00* (2006.01)
(52) U.S. Cl. .................................................. 367/134
(58) Field of Classification Search ............... 367/134, 367/128, 131, 137, 138, 142, 149
See application file for complete search history.

(56) References Cited

U.S. PATENT DOCUMENTS

| | | | | |
|---|---|---|---|---|
| 4,991,149 | A * | 2/1991 | Maccabee | 367/128 |
| 5,784,339 | A * | 7/1998 | Woodsum et al. | 367/134 |
| 6,385,131 | B1 * | 5/2002 | Woodsum et al. | 367/142 |
| 6,813,218 | B1 * | 11/2004 | Antonelli et al. | 367/134 |
| 6,859,419 | B1 * | 2/2005 | Blackmon et al. | 367/134 |

OTHER PUBLICATIONS

Blackmon, Fletcher A., Linear and Non-Linear Opto-Acoustic Underwater Communications, Chapters 3-5, May 2003, USA.*
Berthelot, Yves H., Thermoacoustic generation of narrow-band signals with High Repetition Rate Pulsed Lasers, paper, Mar. 3, 1989, pp. 1173-1181, vol. 85, Journal of Acoustical Society of America, USA.
Bell, Alexander Graham, Upon the Production of Sound by Radiant Energy, paper, Apr. 16, 1881, pp. 510-527.
Tyndall, John, Action of an Intermittent Beam of Radiant Heat Upon Gaseons Matter, paper, Jan. 3, 1881, pp. 307-317.
Sodha, M.S., Rai V., Verman M.P., Konar S., and Maseshwari K.P., Underwater Optical Generation of Sound: Oblique Incidence, paper, Jul. 1993, pp. 1-7, vol. 41, No. 1, PRAMANA-Journal of Physics, India.
Lyamshev L.M. and Naugol'nkh K.A., Optical Generation of Sound: Nonlinear effects (review), paper, Jul. 28, 1980, pp. 357-371, Soviet Physics Acoustics, USSR.

(Continued)

*Primary Examiner*—Dan Pihulic
(74) *Attorney, Agent, or Firm*—James M. Kasischke; Michael P. Stanley; Jean-Paul A. Nasser

(57) ABSTRACT

The present application provides a linear mechanism for optical-to-acoustic energy conversion for optoacoustic communication from an in-air platform to an undersea vehicle. Signals used in underwater acoustic telemetry applications are capable of being generated through the linear optoacoustic regime conversion process. A number of issues concerning linear optoacoustic communication is addressed that lead to a formulation of a linear regime optoacoustic communication scheme. The use of oblique laser bean incidence at an air-water interface to obtain considerable in-air range from the laser source to the vehicle is also addressed. The effect of oblique incidence on in-water range is addressed as well. Optimum and sub-optimum linear optoacoustic sound-generation techniques for selecting the optical wavelength and signal frequency for optimizing in-water range are identified. Optoacoustic techniques employing M-ary frequency shift keying and multifrequency shift keying are compared with communication parameters such as bandwidth, data rate, range coverage and number of lasers employed.

8 Claims, 10 Drawing Sheets

OTHER PUBLICATIONS

Westervelt, Peter J. and Larson, Richard S., Laser-Excited Broadside Array, paper, 1973, pp. 121-122, vol. 54, No. 1, The Journal of the Acoustical Society of America, USA.

Blackmon, Fletcher A., Linear and Non-Linear Opto-Acoustic Underwater Communications, Partial Dissertation, May 2003, USA.

Blackmon, Fletcher A., Antonelli, Lynn T. and Kalinowski, Anthony J., A Remote Optical System For Port and Harbor Defense, pp. 1-8, Naval Undersea Warfare Center, USA.

Blackmon, Fletcher A. and Antonelli, Lynn T., Remote Aerial, Opto-Acoustic Communications and Sonar, pp. 1-9, Naval Undersea Warfare Center, USA.

Blackmon, Fletcher A., Estes, Lee, and Fain, Gilbert, Linear Optoacoustic Underwater Communication, paper, Jun. 20, 2005, pp. 3833-3845, vol. 44, No. 18, Applied Optics, USA.

Blackmon, Fletcher A. and Antonelli, Lynn T., Experimental Demonstration of Multiple Pulse Nonlinear Optoacoustic Signal Generation and Control, paper, Jan. 1, 2005, pp. 103-112, vol. 44, No. 1, Applied Optics, USA.

Yves H. Berthelot, Thermoacoustic Generation of Narrow-Band Signals; with High Repetition Rate Pulsed Lasers, Article, Mar. 1989, pp. 1173-1181, vol. 85, No. 3, J. Acoustic Society of America, USA.

Nicholas P. Chotiros, Nonlinear Optoacoustic Underwater Sound Source, paper, 1988, pp. 255-262, with 2 pgs. of drawings, Applied Research Laboratories, University of Texas at Austin, Austin, TX, USA.

Joachim Noack and Alfred Vogel, Laser-Induced Plasma Formation in Water at Nanosecond to Femtosecond Time Scales: Calculation of Thresholds, Absorption Coefficients, and Energy Density, Article, Aug. 1999, pp. 1156-1167, vol. 35, No. 8, IEEE Journal of Quantum Electronics, USA.

A. Vogel, S. Busch and U. Parlitz, Shock Wave Emission and Cavitation Bubble Generation by Picosecond and Nanosecond Optical Breakdown in Water, Article, Jul. 1996, pp. 148-165, 100 (1), J. Acoustic Society of America, USA.

L.M. Lyamshev and L.V. Sedov, Optical Generation of Sound in a Liquid: Thermal Mechanism (review), Article, Jan.-Feb. 1981, pp. 4-18, 27 (1), Sov. Phys. Acoust.

Fletcher Blackmon, Lee Estes and Gilbert Fain, Linear Optoacoustic Underwater Communication, Article, Jun. 20, 2005, pp. 3833-3845, vol. 44, No. 18 Applied Optics, USA.

Fletcher Blackmon and Lynn Antonelli, Experimental Domonstration of Multiple Pulse Nonlinear Optoacoustic Signal Generation and Control, Article, Jan. 1, 2005, pp. 103-112, vol. 44, No. 1, Applied Optics, USA.

P.E. Nebolsine, Radiation-Induced Sound, Report, Jan. 1977, i-65, PSI TR-82, Physical Sciences Inc., USA.

Fletcher Blackmon, Lynn Antonelli, Lee Estes and Gilbert Fain., Experimental Investigation of Underwater to In-Air Communications. Conference paper, Jun. 18-20, 2002, UDT Europe Conference, La Spezia, Italy.

Fletcher A. Blackmon, Linear and Non-Linear Opto-Acoustic Underwater Communications, Partial Dissertation, May 2003, USA.

* cited by examiner

METHOD FOR LINEAR OPTOACOUSTIC COMMUNICATION AND OPTIMIZATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a method of linear optoacoustic communication and optimizing the communication between an in-air platform and an undersea vehicle by selecting various parameters such as power, modulation frequency and a laser wavelength to increase the communication range to an undersea receiver.

(2) Description of the Prior Art

In 1881, Alexander Graham Bell discovered that acoustic energy could be generated when high intensity light impinged on various media, such as water. This acoustic energy generation is typically called the "optoacoustic effect".

In the optoacoustic effect, high intensity light is exponentially attenuated by the impinged medium resulting in local temperature fluctuations that give rise to volume expansion and contraction. These expansions and contractions generate a propagating and measurable pressure wave.

The energy transfer of the optoacoustic effect can be divided into a linear regime and a non-linear regime on the basis of energy density and irradiance imparted to the medium. The linear regime occurs when the acoustic pressure is proportional to the laser power and the physical state of the medium does not change. The linear optoacoustic regime generally uses intensity modulated laser sources of relatively low energy density. The effect of the optical absorption of the laser light in the medium is to produce an array-like arrangement of thermoacoustic sources that generate a modulated pressure wave at the laser amplitude modulation frequency.

In contrast to the linear regime, the non-linear regime occurs when the acoustic pressure depends non-linearly on the laser power and the physical state of the medium does change.

The benefits of the optoacoustic effect (optoacoustic transduction) are: in-water transducer hardware is not required; transmit frequency and directivity patterns can be controlled by a proper laser/modulation selection; and a moving optoacoustic source does not generate flow noise at any speed.

The linear optoacoustic conversion process as well as sound attenuation due to spreading loss and absorption are well documented. However, the equations describing both sound attenuation scenarios have not been analyzed to determine the laser parameters for optimizing communications range based on parameters of the medium, bandwidth, and a received signal to noise ratio (SNR). Previous optoacoustic work also did not consider the underwater communication application or the optimization of a generated acoustic source in order to increase in-water range.

To efficiently evaluate linear and non-linear techniques, a need exists for improved acoustic communication performance for both normal and oblique laser beam incidence in terms of range and data rates based on laser systems that are either practical or commercially available or whose parameters have been optimized through simulation for angular coverage as well as for in-air range and in-water range.

SUMMARY OF THE INVENTION

It is therefore a primary object of the present invention to provide a linear optoacoustic communication optimization method based on parameter choices such as laser power, laser wavelength and signal frequency and a laser beam incidence angle and a receiver observation angle.

It is a further object of the present invention to provide a linear optoacoustic communication optimization method employing a set of practical parameter choices to provide improved range coverage.

It is a still further object of the present invention to provide a linear optoacoustic communication optimization method using commercially-available lasers.

In order to attain the objects described above, the present invention provides the use of a linear optoacoustic conversion equation coupled with underwater spreading and absorption equations along with measured bandwidth and received signal to noise ratio (SNR) to produce a non-linear equation in the range variable. The graphical model solution of this equation provides range as a function of laser, medium and communication parameters. The communication range is also optimized by using frequency shift key signaling and selecting the appropriate signaling frequency for given sea conditions, bandwidth, and SNR.

BRIEF DESCRIPTION OF THE DRAWINGS

Further objects and advantages of the invention will become readily apparent from the following detailed description and claims in conjunction with the accompanying drawings, wherein:

DESCRIPTION OF THE PREFERRED EMBODIMENT

Figure 1:
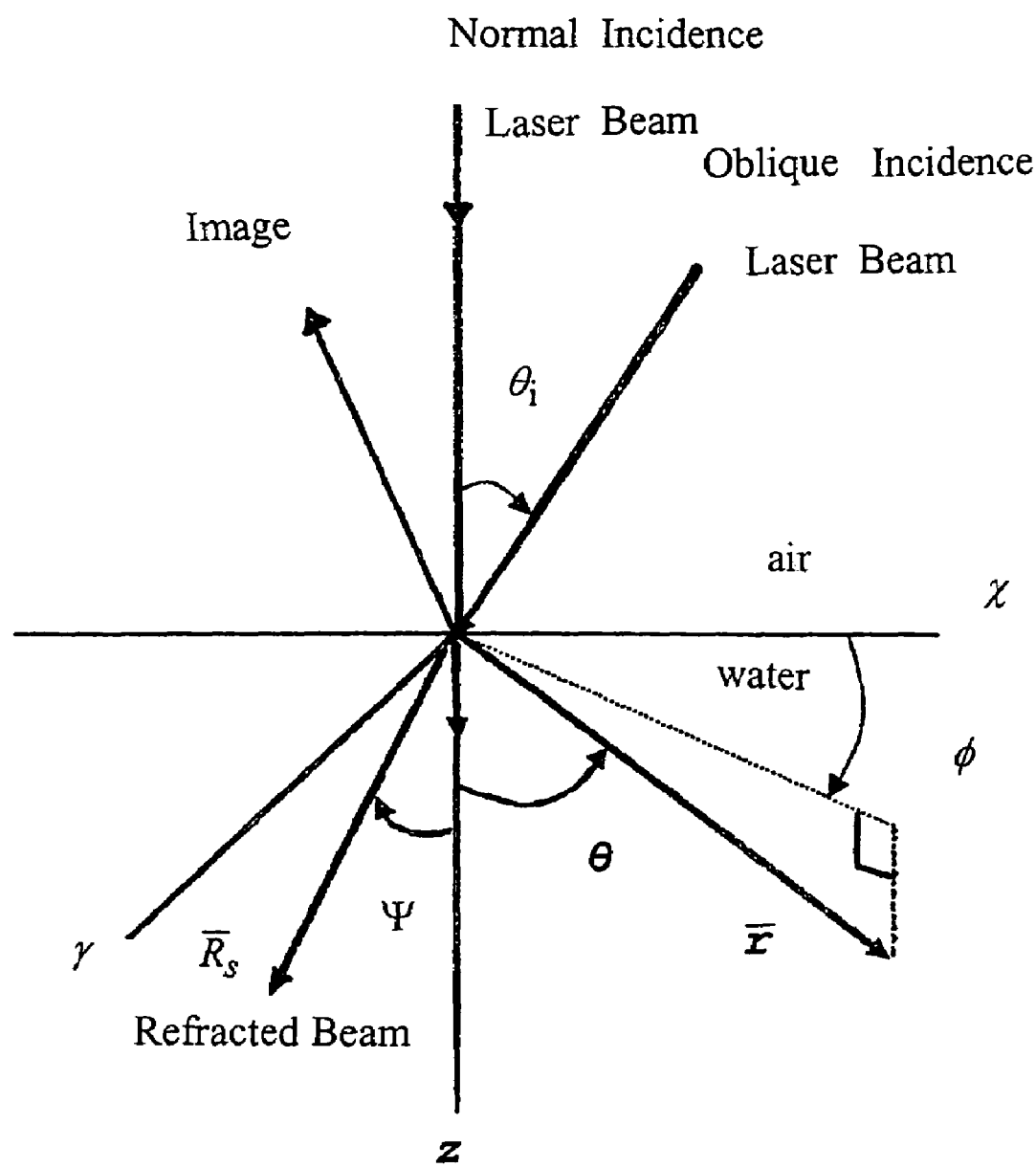
FIG. 1 depicts normal and incidence geometry produced by a laser beam.

The present invention addresses achievable communication ranges and data rates by describing optimum and suboptimum linear optoacoustic techniques. The techniques may be used for optoacoustic communication between an in-air platform or surface vessel and a submerged vessel such as an unmanned undersea vehicle.

The optimum linear optoacoustic sound generation method for optimizing in-water range is based on optimum and practical parameter choices for the laser wavelength and signal frequency as a function of a laser beam incidence angle and receiver observation angle.

The suboptimum linear optoacoustic sound generation method, described subsequent, employs a single set of practical parameters to provide suboptimal range coverage. These optimum and suboptimum M-ary frequency shift keying (M-ary FSK) and multi-frequency shift keying (MFSK) signaling methods are compared to other communication techniques to demonstrate the effectiveness of the method of the present invention.

Linear Optoacoustic Formulation

For describing the linear optoacoustic formulation, the pressure spectral response as a function of range, medium parameters, laser beam parameters, and modulation parameters within the linear optoacoustic regime for both normal laser beam incidence and oblique laser beam incidence; the Green's function integral is solved to compute the acoustic result obtained by integrating the contribution of the thermoacoustic line array of continuous sources at an in-water receiver.

The result of this integration is given in Equations (1) and (2) for normal and oblique incidence. The time domain expressions for the pressure signal are obtained by taking the real part of the inverse Fourier transform of Equation (1—normal incidence) and Equation (2—oblique incidence) computationally $$P(r, \omega) = \frac{-TI_0 \beta a^2}{2C_p} \frac{\exp(ikr)}{r} \frac{\omega^2 \tau_\mu}{1+\omega^2 \rho_\mu^2} \times \exp\left(\frac{-\omega^2 \tau_a^2}{4}\right) I(\omega) \quad (1)$$

$$P(r, \omega) = \frac{-\frac{TK}{\mu} \exp(ikR) \exp\left\{\frac{[-k^2 a^2 (\sin^2\theta \sin^2\varphi \cos^2\varphi \sin^2\theta \cos^2\varphi + \sin^2\varphi \cos^2\theta)]}{4}\right\}}{\Delta} \frac{\Lambda}{\mu} i(\omega) \quad (2)$$

where $$K = \frac{i\mu\beta P_0 \omega}{4\pi C_p R}; \quad (3)$$

$$\frac{\Lambda}{\mu} = -2\sinh(\xi) - 2i\sigma\cos\theta\cos\psi\cosh(\xi) + 2i\sigma\sin\psi\sin\theta\cos\phi\sinh(\xi) \quad (4)$$

$$\xi = \frac{k^2 a^2 \sin 2\theta \cos\phi \sin 2\psi}{8} \quad (5)$$

$$\Delta = 1 - 2i\sigma \sin\psi \sin\theta \cos\phi + \sigma^2(\cos^2\theta \cos^2\psi - \sin^2\psi \sin^2\theta \cos^2\phi), \quad (6)$$

$$I(\omega) = \int_{-\infty}^{\infty} I(t)\exp(i\omega t)\,dt, \quad (7)$$

$$\tau_\mu = \frac{\cos\theta}{\mu c}, \quad (8)$$

$$\tau_a = \frac{a\sin\theta}{c}, \quad (9)$$

$$\psi = \sin^{-1}\left(\frac{n_1}{n_2}\sin\theta_i\right). \quad (10)$$

The other parameters included in Equations (1) through (10) are defined in the following list of symbols:

T=Optical transmissivity of the liquid;

$I_0$=Laser intensity amplitude, $$\frac{P_0}{a^2};$$

$\beta$=Thermal coefficient of expansion;

$C_p$=Specific heat of the liquid;

$\alpha$=Laser beam radius;

$\mu$=Optical absorption coefficient;

r=Range to observation point;

k=Acoustic wave number;

$\omega$=Angular frequency;

$\tau$=Laser pulse duration;

$\tau_\mu$=Vertical characteristic delay time;

$\tau_\alpha$=Horizontal characteristic delay time;

$\theta$=Angle of observation from the vertical;

$\theta_i$=Laser beam incidence angle;

$\phi$=Angle of observation from horizontal;

$\psi$=Refracted in-water angle;

I(t)=Temporal laser waveform; and

I($\omega$)=Spectrum of temporal laser waveform.

T is the optical transmissivity of the liquid for a given polarization of the laser light. For a transverse magnetic (TM) polarized laser beam, the optical transmissivity is given by the Fresnel equation, $$T = 1 - \left[\frac{n_2\cos(i) - n_1\cos(\psi)}{n_2\cos(i) + n_1\cos(\psi)}\right]^2, \quad (11)$$

where $n_1$=1 for air and $n_2$=1.33 for water.

Referring now to the drawings, FIG. 1 depicts a thin laser beam normal and oblique incidence geometry. Under the thin beam assumption, the pressure responses in Equations (1) and (2) take the following forms in Equation (12) for normal incidence and Equation (13) for oblique incidence;

$$P(r,\omega) = \frac{-TI_0\beta a^2}{2C_p} \frac{\exp(ikr)}{r} \frac{\omega^2\tau_\mu}{1+\omega_\mu^2\tau^2} I(\omega) \quad (12)$$

$$P(r,\omega) = \left[\frac{-TK}{\mu}\exp(ikr)\right]\left(\frac{-2i\sigma\cos\theta\cos\psi}{\mu}\right)I(\omega). \quad (13)$$

The optical-to-acoustic transfer function for normal incidence is given by $$\frac{p(,\omega)}{I(\omega)}.$$

Referring to Equation (1) for simplicity, the $$\frac{\omega^2\tau_\mu}{-(1+\omega^2\tau_\mu^2)}$$

term normalized by multiplication by $\tau_\mu$ represents a second order high-pass filter in the frequency domain with a 3-dB cutoff frequency of $$f = \frac{1}{2\pi\tau_\mu} = \frac{\mu c}{2\pi\cos\theta}. \quad (14)$$

This frequency cutoff is dependent on the angle of observation and the optical absorption coefficient. The term exp $$\left(\frac{-\omega^2\tau_a^2}{4}\right)$$

is present when not making the thin beam approximation (ka<<1). This factor is non-zero for θ greater than 0° and at other angles represents a low-pass filter with a 3-dB cutoff frequency $$f = \frac{c\sqrt{-\ln(0.7071)}}{\pi a \sin\theta}. \quad (15)$$

These two filtering functions together form a bandpass-filter structure that provides the frequency dependence for the transfer function given a fixed value of θ.

The thin beam oblique incidence pressure spectral magnitude derived from Equation (13) is given by $$|P(r,\omega)| = \frac{K'T}{\mu r}\frac{2\sigma|\cos\theta\cos\psi|}{\Omega}; \quad (16)$$

where $$\Omega = \{[1+\sigma^2(\cos^2\theta\cos^2\psi-\sin^2\psi\cos^2\phi)]^2+4\sigma^2\sin^2\theta\sin^2\psi\cos^2\phi\}^{1/2} \quad (17)$$

and the finite beam oblique incidence pressure spectral magnitude derived from Equation (2) is given by $$|P(r,\omega)| = \frac{\left(\frac{|K'|T}{\mu r}\right)\exp\frac{-k^2a^2[\sin^2\theta\sin^2\phi+\cos^2\psi\sin^2\theta\cos^2\phi+\sin^2\psi\cos^2\theta]}{4}\Xi}{\Omega} \quad (18)$$

where $K'=\mu\beta\omega P_0/4\pi C_p$ and $$\Xi = \left\{\begin{array}{c}[2\cosh(2\xi)-2]-\sigma^2\sin2\psi\sin2\theta\cos\phi\sinh(2\xi)+\\ 2\sigma^2\cos^2\theta\cos^2\psi[\cosh(2\xi)+1]+\\ 2\sigma^2\sin^2\psi\sin^2\theta\cos^2\theta[\cosh(2\xi)-1]\end{array}\right\}^{1/2} \quad (19)$$

$$\sigma = \frac{k}{\mu} = \frac{2\pi}{\lambda\mu}$$

is the ratio of the inverse of the optical absorption coefficient to the acoustic wavenumber or alternatively the number of wavelengths contained in the effective array length ($\mu^{-1}$).

The finite beam, in-water directional factor for oblique incidence is taken from Equation (18) by collecting terms with angular dependence, $$D(\theta,\phi) = \frac{\exp\frac{-k^2a^2(\sin^2\theta\sin^2\varphi+\cos^2\psi\sin^2\theta\cos^2\varphi+\sin^2\psi\cos^2\theta)}{4}\Xi}{\Omega} \quad (20)$$

The thin beam, in-water directional factor for oblique incidence is simplified by replacing the exponential term in the numerator of Equation (20) with unity value and reducing Equation (19):

$$D(\theta, \varphi) = \frac{2\sigma|\cos\theta\cos\psi|}{\Omega} \quad (21)$$

The thin beam directional factor for normal incidence is given by setting $\psi=0°$ in Equation (21) which corresponds to $\theta_i=0°$:

$$D_{thin}(\theta) = \frac{2\sigma|\cos\theta|}{1+\sigma^2\cos^2\theta}. \quad (22)$$

The thin beam normal incidence directional factor has a maximum at $$\theta_{MAX} = \cos^{-1}\left(\frac{c\mu}{2\pi f}\right). \quad (23)$$

As σ increases, the acoustic beam becomes more directive. The acoustic sound level can be increased by increasing the laser power and/or increasing the laser modulation frequency. Increasing the frequency sharpens the directionality and decreases response at other than the maximum response angle. The 3-dB beamwidth for the thin beam normal incidence situation is given as $$\Delta\theta_{3dB} = \left\{\cos^{-1}\left[(\sqrt{2}-1)\frac{\mu}{k}\right] - \cos^{-1}\left[(\sqrt{2}+1)\frac{\mu}{k}\right]\right\}. \quad (24)$$

In addition, the useable upper acoustic frequency is limited by transmission loss from acoustic absorption which increases non-linearly with increasing frequency.

The thin beam directional-factor maximum response for oblique incidence at $\phi=0°$ and $\phi=90°$ is respectively given by $$\theta_{MAX} = \cos^{-1}\left(\frac{1}{\sigma\cos\psi}\right)\phi = 0°; \text{ and} \quad (25)$$

$$\theta_{MAX} \approx \cos^{-1}\left(\frac{2\sin^2\psi}{\sigma^2\cos^4\psi}+1\right)\phi = 90°. \quad (26)$$

It is noted that the finite beam expressions for the directional maximum responses are more complicated and can shift the thin beam maximum response result to $\theta_{MAX}=0°$.

The temporal pulse waveshape, I (t), of the laser is varied with a number of modulation waveforms in the following simulated data section. The determined pressure responses are then analyzed to provide figures for the linear optoacoustic based communication.

Linear Optoacoustic Regime Simulation

In order to more clearly describe linear optoacoustics, an example of a high power (25 kW at full capability), 2 milliseconds (ms) long pulse Nd: Glass ($\lambda$=1053 nm) laser system is employed. The laser system produces an approximately square pulse with gradual falloff; thereby, avoiding any large amplitude transients that may produce non-linear optoacoustic effects under certain extreme focusing conditions.

The laser beam is modulated at 10 kHz using a mechanical chopping disc. In an alternate method, the laser beam is modulated through the use of an electro-optic Pockels cell modulator using a number of modulation waveforms: sinusoidal modulation at 10 kHz, 4 bit BPSK (binary phase shift keyed) modulation, 11 (5 kHz to 15 kHz with 1 kHz spacing), 5 (8 kHz to 12 kHz with 1 kHz spacing), and 2 (10 kHz and 12 kHz) tone MFSK (multi-frequency shift keyed) modulation, and FSK (frequency-shift keyed) modulation. Square wave pulses of 60 microsecond duration spaced at 0.1 milliseconds are employed for pulse train modulation to generate a 10 kHz fundamental tone.

Figure 2:
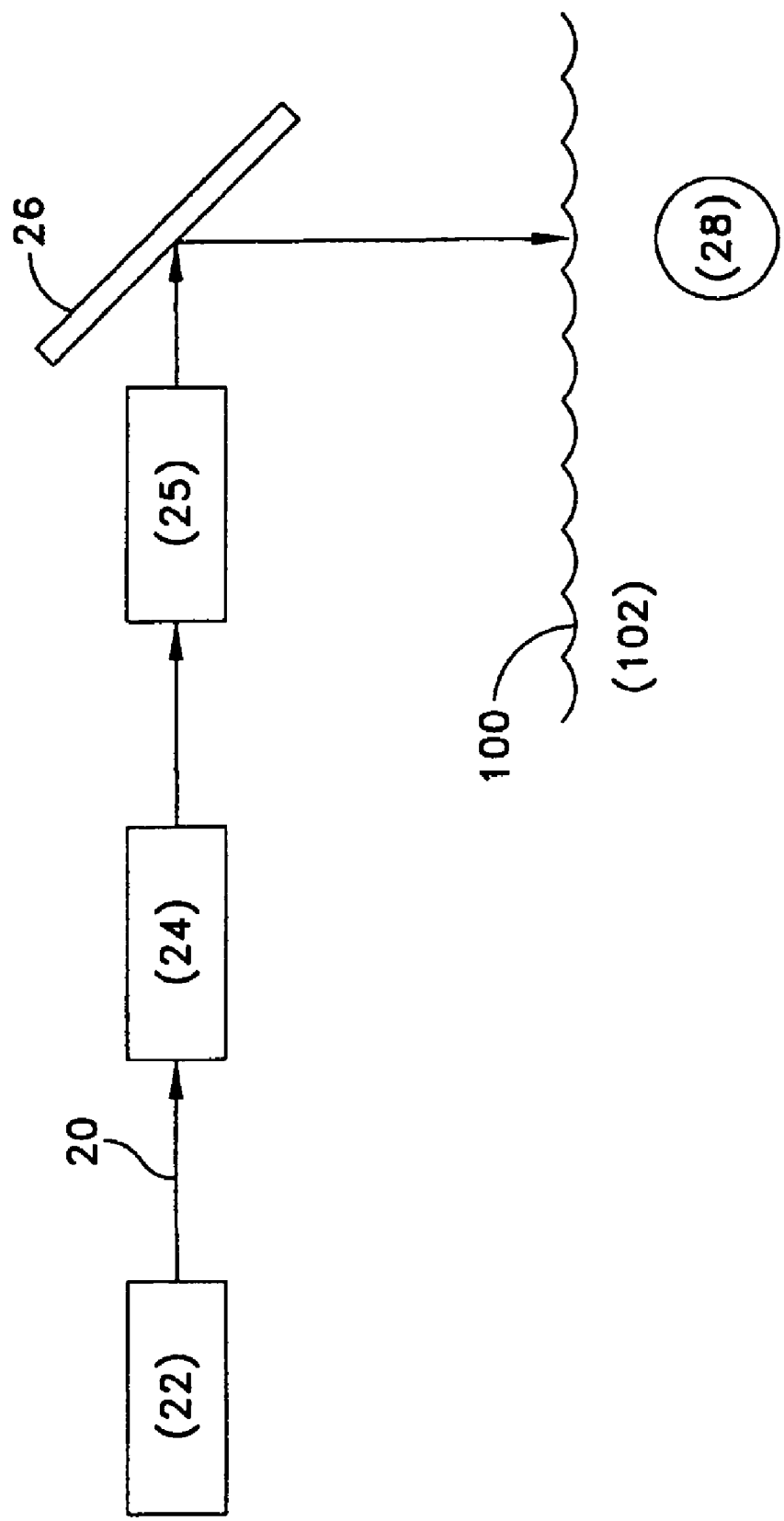
FIG. 2 is a block diagram of a linear optoacoustic test setup.
Figure 3:
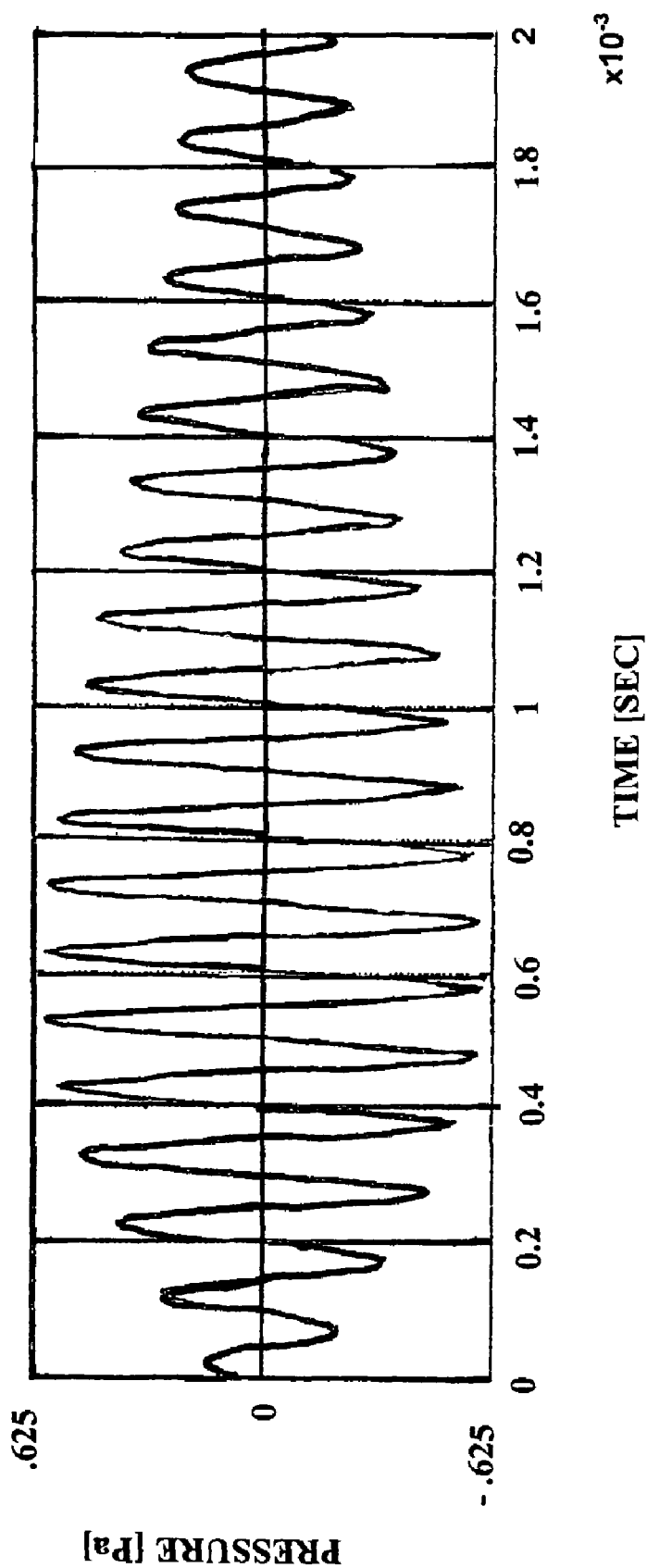
FIG. 3 is a graph depicting linear optoacoustic regime experimental sinusoidal pulse modulation temporal results.
Figure 4:
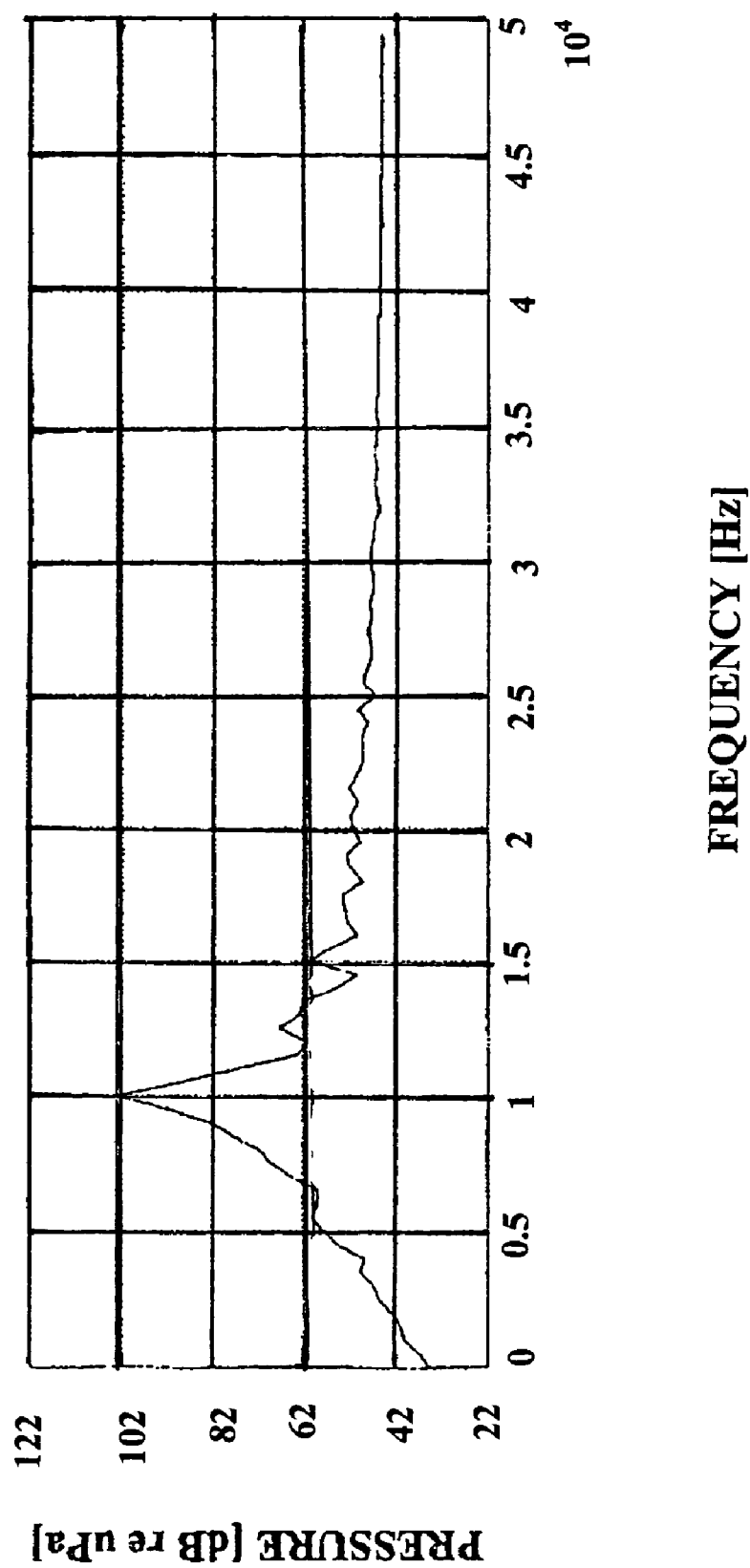
FIG. 4 is a graph depicting linear optoacoustic regime experimental sinusoidal pulse modulation spectral results.
Figure 5:
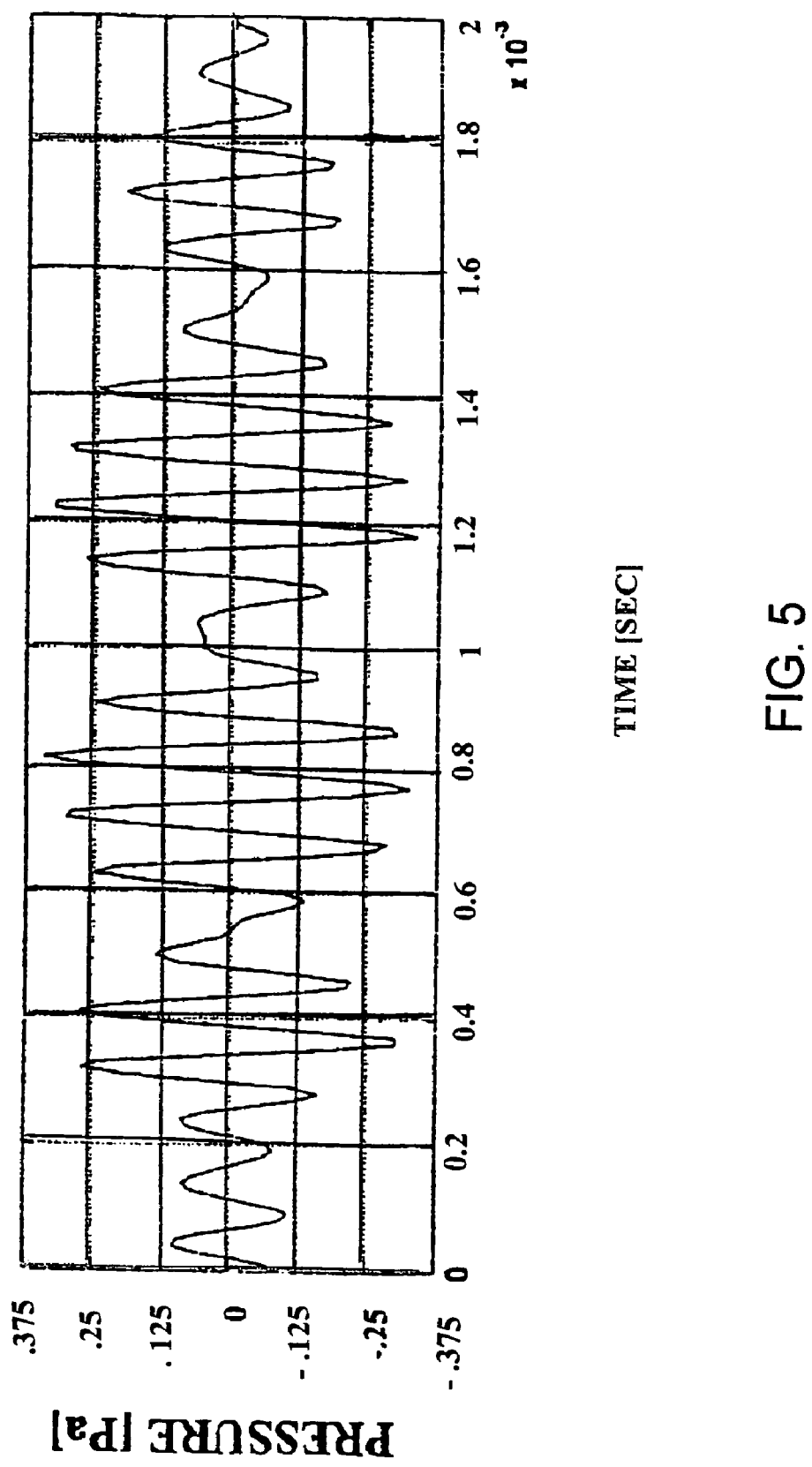
FIG. 5 is a graph depicting linear optoacoustic regime experimental 2-FSK modulation temporal waveform results.
Figure 6:
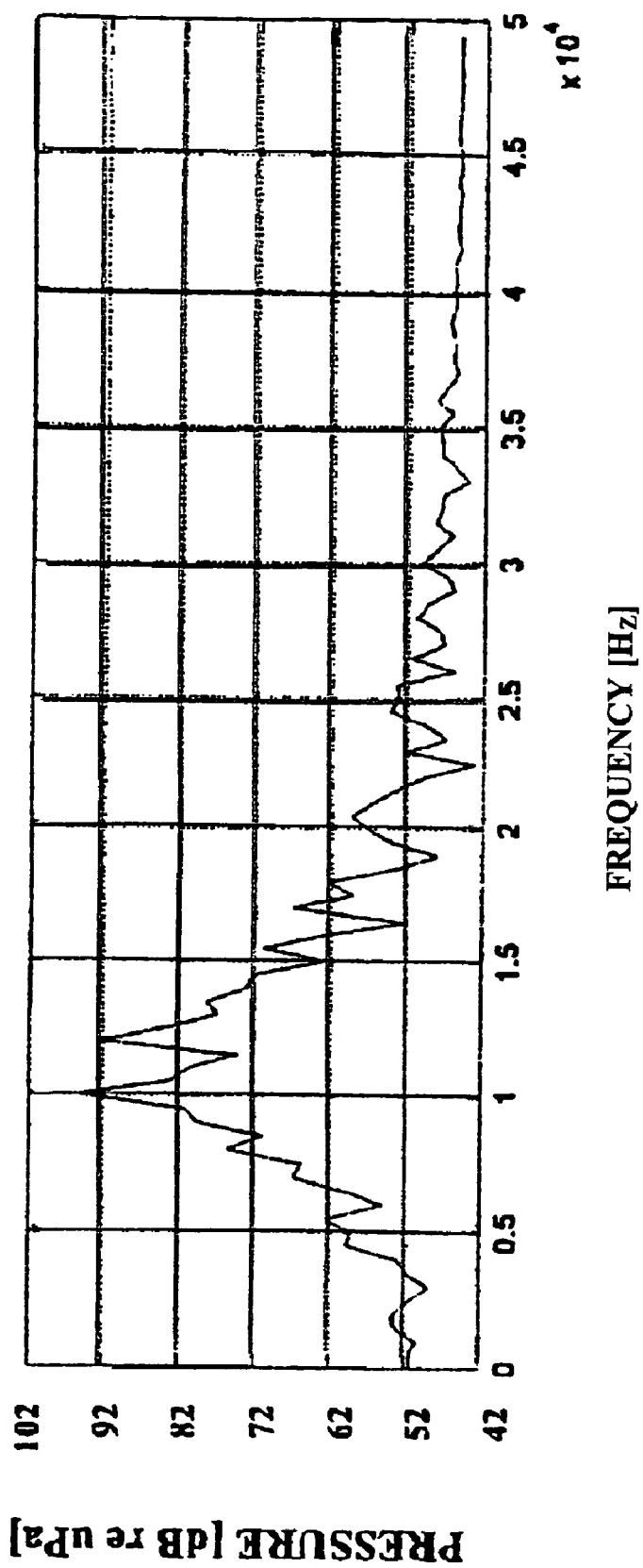
FIG. 6 is a graph depicting linear optoacoustic regime experimental 2-FSK modulation spectral waveform results.

A diagram of a physical test setup for the method of the present invention is shown in FIG. 2. In FIG. 2, a laser beam 20, originating from a laser 22, is directed first through a modulator 24, then an optical focusing section 25 and reflected by a 45-degree mirror 26 such that the laser beam is directed vertically downward onto a surface 100 of a water medium 102. A hydrophone 28, acting as a receiver for sensing and measurements, is placed in the water medium 102, below the point of incidence of the laser beam 20.

The output of the hydrophone 28 is low-pass filtered at 20 kHz with a fourth order butterworth filter (not shown) to attenuate harmonics and also filtered with a 1 kHz fourth order butterworth highpass filter (not shown) to attenuate low frequency noise before digitization. The data gathered by the hydrophone 28 is analyzed to determine the measurements of interest such as temporal waveshape, spectral waveshape and sound pressure level (i.e., for achievable communication range).

The simulated and experimental results are tabulated in Table 1—indicating the achievable sound pressure level (SPL) and in-water range.

TABLE 1

Linear Optoacoustic Regime Experimental and Simulation Results

| Wave Shape | Laser Energy (J) | Simulated SPL (dB re 1μ Pa) | Experimental SPL (dB re 1μ Pa) | Simulated Range (M) | Experimental Range (M) |
|---|---|---|---|---|---|
| 10-kHz Chopper | 30 | 111 | 113 | 75 | 100 |
| 10-kHz Sinewave | 25 | 117.2 | 111.8 | 143 | 78 |
| Pulse Train | 25 | 119 | 112.1 | 175 | 80 |
| 4-Bit BPSK | 25 | 113.5 | 106 | 34 | 15 |
| 11-Tone MFSK | 25 | 102.5 | 101.1 | 27 | 23 |
| 5-Tone MFSK | 25 | 105.5 | 100.7 | 38 | 22 |
| 2-Tone MFSK | 25 | 112.3 | 104.4 | 82 | 33 |
| 2-Tone FSK | 25 | 111.7 | 104.9 | 55 | 25 |

The peak energy for the light output from the 10 kHz mechanical chopper is one-half of the laser energy because half of the light is blocked at any one time. The SPL is computed based on the peak level for each wave shape. Range is calculated based on a received signal to noise ratio of 10 dB, spherical spreading, acoustic absorption, noise spectrum levels for sea state 1, and the noise bandwidth corrections based on the bandwidth of the wave shape.

The difference in the in-water range is directly related to the difference in SPL. Temporal and spectral results for the sinusoidal pulse and the 2-FSK modulation waveform are shown in FIG. 3 through FIG. 6.

Linear Optoacoustic Laser Source Selection

There are a number of conclusions and recommendations that can be made regarding the choice of a laser system; such as, efficient signal architectures, achievable data rates, achievable communication ranges based on sound pressure level (SPL), bandwidth, and the tradeoff of data rate versus communication range.

There are three major categories of linear optoacoustic generation that can be employed to provide information bearing signals. The first category is modulation of a long pulse (at least one millisecond) duration laser. The second category is the use of continuous wave (CW) lasers. The third category is the use of high repetition rate, short duration pulse lasers (100 microseconds or less) to form periodic signals.

The modulation approach of the first category, the long pulse duration laser, has results that indicate that single sinusoidal generation is the most energy efficient (i.e., produces the highest SPL and has the largest in-water range capability). Other waveforms spread the acoustic energy over a wider bandwidth; thereby, reducing the signal level. BPSK and MFSK signals can be generated via the linear optoacoustic conversion mechanism; however, the generated BPSK signal is only useful at very close range. The MFSK signal becomes more range efficient and distinguishable as the number of tones is decreased.

The modulation approach of the first category is most effective if the energy is narrowband and lasts for a sufficient duration. As such, an efficient way to communicate is to use one or more lasers employing a 2-, 4-, or 8-FSK or hopped FSK approach. Each FSK signal is separated (spaced) based on the repetition rate of the laser being used. It is possible also to use the MFSK approach with a small number of tones per pulse—based on the desired communication range and data rate. Using MFSK signaling achieves a higher data rate; however, at the expense of in-water range.

The second category of optoacoustic generation uses continuous wave (CW) lasers. However, due to the low average power provided by this laser system within an acoustic communication symbol duration, this laser system does not provide a sufficient acoustic signal level and in-water range.

The third category of optoacoustic generation, which is exemplified, modulates the laser beam with a square-wave pulse train within the limits of the Pockels cell in which the results indicate that FSK signals can be generated by varying the repetition rate of the pulse train. In order to maintain the same average power level as a long laser pulse, the individual pulses must be at higher peak power levels. If the average power of the laser is normalized in the case of the pulse train and compared to a long laser pulse, a double factor improvement in pressure amplitude results is predictable. If short pulse duration, high repetition rate lasers were to exist having an average power that equaled or exceeded the average power produced by long pulse duration lasers then higher SPL signals could be created.

Based on practical and commercially available lasers, the long pulse laser of at least one millisecond is recommended for communication applications and provides the best SPL. However, the long pulse laser system has an upper limit on data rates due to the maximum possible number of laser firings per second.

Multiple Laser Source Array

Figure 7:
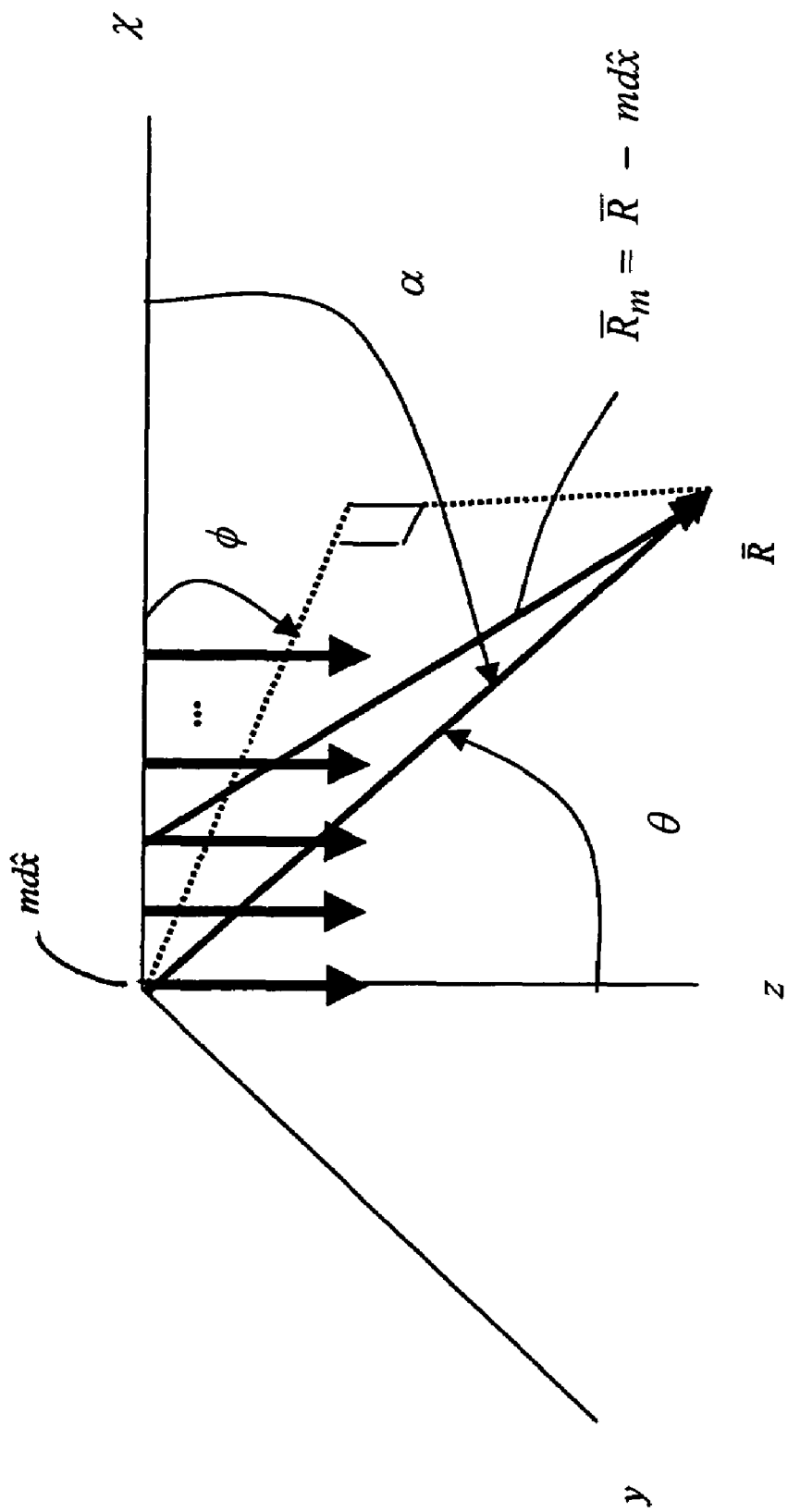
FIG. 7 depicts the geometry of a multiple laser source array.

In another simulation, a number of laser sources can be combined to form a laser array source (i.e. a spatially periodic source that can be used for linear regime optoacoustic communication). The laser array source can be used to increase the amplitude and directivity of a signal produced by a single laser. The use of a normal incidence laser array source is depicted in FIG. 7. The figure depicts "M" laser beams normal to the air-water interface with each laser beam separated by a distance "d".

The expression for the total pressure spectrum at a range, $R=|R|$, from the source combining all the individual contributions via linear superposition is given by $$P_T(R, \omega) = \sum_{m=0}^{M-1} P(R_m, \omega) = P_{single}(\omega, \theta) \sum_m \frac{\exp(ikR_m)}{R_m} \quad (27)$$

where making use of Equation (1), the following result is obtained:

$$P_{single}(\omega, \theta) = \frac{i\mu\omega\beta}{4\pi C_p} I(\omega) I_o \left\{ a^2 \pi \exp\left[-\left(\frac{ka\sin\theta}{2}\right)^2\right] \right\} \times \left[\frac{-2ik\cos\theta}{\mu^2 + k^2\cos^2\theta}\right] \quad (28)$$

and in the far-field case, the following holds:

$$\sum_m \frac{\exp(ikR_m)}{R_m} \cong \frac{1}{R} \sum_m \exp(ikR_m) \cong \quad (29)$$

$$\frac{1}{R} \sum_{m=0}^{M-1} \exp[ik(R - md\cos\alpha)] \cong \frac{\exp(ikR)}{R} \sum_{m=0}^{M-1} [\exp(ikd\cos\alpha)]^m =$$

$$\frac{\exp(ikR)}{R} \exp\left[i(M-1)\frac{\chi}{2}\right] \times \left[\frac{\sin\left(\frac{M\chi}{2}\right)}{\sin\left(\frac{\chi}{2}\right)}\right],$$

where $X=kd\cos\alpha$ and $\alpha=\cos^{-1}(\sin\theta\cos\phi)$. The array gain function can be defined as $$A_{GAIN}(M, f, d, \alpha) = \left|\frac{\sin\left(\frac{M\chi}{2}\right)}{\sin\left(\frac{\chi}{2}\right)}\right|. \quad (30)$$

A non-directive approach for the use of multiple laser sources based on known array theory is to employ the sources, spaced such that $d \ll \lambda_{acoustic}$, as an equivalent horizontal point source with an amplitude factor of M. In this approach, the signal array gain occurs at all receiver observation angles. This is desirable when the exact location of the submerged platform to be communicated with is not known.

Sea Surface Slope Induced Signal Loss

It is a practical interest to determine the effects associated with air-water interface surface tilts (i.e., slopes at the air-water interface on the pressure response associated with normal and oblique incidence in the context of a single, short duration, narrow laser pulse over which the surface slope is considered to be constant). New $\theta$, $\phi$, and $\Psi$ angles due to the surface slope can be determined and used in previously derived equations to estimate performance. The surface tilt factor (STF) can be expressed in the following way $$STF(a, f, \mu, \theta_i, \theta_{itilt}, \theta, \varphi, \psi, \theta_{tilt}, \varphi_{tilt}, \psi_{tilt}) = \quad (31)$$

$$\frac{FresnelFactor(\theta_{itilt}, \psi_{tilt})}{FresnelFactor(\theta_i, \psi)} \frac{D(\theta_{tilt}, \varphi_{tilt}, \psi_{tilt})}{D(\theta, \varphi, \psi)},$$

where:

$f$=the signal frequency;

θ=the surface unperturbed, in-water vertical observation angle;

φ=the surface unperturbed, horizontal in-water observation angle;

Ω=the surface unperturbed, refracted in-water laser beam angle;

$θ_i$=the surface unperturbed, vertical laser beam incidence angle;

$θ_{tilt}$=the surface tilted, in-water vertical observation angle;

$φ_{tilt}$=the surface tilted, in-water horizontal observation angle;

$Ω_{tilt}$=the surface tilted, refracted in-water laser beam angle; and $θ_{i\ tilt}$=is the surface tilted, vertical laser beam incidence angle.

Equation (31) is valid for normal and oblique incidence laser beams. Equation (31) shows the parameter dependencies of the surface tilt factor for the case of a constant surface slope during a short duration laser pulse of several milliseconds or less. The STF is dependent on the laser beam radius, frequency of the laser beam modulation, the optical absorption coefficient, the initial laser beam incidence angle, the tilted laser beam incidence angle, the angles associated with the non-surface tilted directivity function and the angles associated with the surface tilted directivity function.

The value of the STF is determined by two terms. The first term is the ratio of the Fresnel factors. The second term is the ratio of the tilted and non-tilted directivity functions provided by Equation (21)—using the unperturbed angle set for the denominator and the tilted angular set for the numerator. Gain or loss due to surface tilt is dictated by the product of both terms in the STF.

A value of unity exists when there is no surface slope during a given laser pulse. Tilts (i.e. slopes that change the effective angle of incidence to move away from the peak of the Fresnel curve) decrease the first term, resulting in loss for that term. Surface tilts that decrease the value of the directivity function by providing a smaller response that is further away from the maximum response at the tilted set of angles produce loss as compared to the case with no surface tilt. The effect of surface slope on the directivity term can be mitigated by choosing parameters that provide an acoustic source pattern with a wide 3-dB beamwidth.

Linear Optoacoustic Regime Optimization

This section details the optimization of the linear regime optoacoustic conversion equation and sound transmission parameters that are important for underwater acoustic propagation and detection. The following subsections discuss optimum and suboptimum linear optoacoustic signal generation in terms of efficient signaling frequency use, laser wavelength based on an optical absorption coefficient, beampattern and range coverage. Another subsection deals with communication system tradeoffs for candidate communication schemes.

A. Linear Optoacoustic Optimum Parameter Selection Method

An expression for the maximum communication range is based on the linear optoacoustic pressure spectrum conversion equation, sound absorption in water as a function of range and frequency, ambient sea state noise, signal-to-noise ratio, signal duration, and noise bandwidth. The optimization expression is given by the signal-to-noise ratio formulation in Equation (32).

Equation (32) can be used both for normal incidence by substituting Equation (33) into Equation (32) or for oblique incidence by substituting the oblique incidence pressure relation Equation (34) into Equation (32). Oblique laser beam incidence provides increased in-air range from a source to a receiver at the expense of in-water communication range. The derivation for optimizing in-water range is given as follows:

$$\frac{P_{OA}(r)P_{abs}(r)}{P_{Noise}} = SNR; \text{ where} \tag{32}$$

$$P_{OA}(r) = \frac{\beta c P_o}{4\pi C_p r}\left(\frac{\mu k^2 \cos\theta}{\mu^2 + k^2 \cos^2\theta}\right)\exp\left[-\left(\frac{ka\sin\theta}{2}\right)^2\right]; \tag{33}$$

$$P_{OA}(r) = \tag{34}$$

$$\frac{\left(\frac{|K'|T}{\mu r}\right)\exp\frac{-k^2 a^2(\sin^2\theta\sin^2\phi + \cos^2\psi\sin^2\theta\cos^2\phi + \sin^2\psi\cos^2\theta)}{4}\Xi}{\{[1 + \sigma^2(\cos^2\theta\cos^2\psi - \sin^2\psi\sin^2\theta\cos^2\varphi_L]^2 + 4\sigma^2\sin^2\psi\sin^2\theta\cos^2\varphi\}^{1/2}}$$

$$P_{abs}(r) = \exp\left(\frac{-\gamma \times r}{8.7}\right), y = \left(\frac{f}{1000}\right)^2\left[\frac{8 \times 10^{-5}}{0.7 = \left(\frac{f}{1000}\right)^2} + \frac{0.04}{6000 + \left(\frac{f}{1000}\right)^2}\right]; \tag{35}$$

in decibels per meter, $$P_{Noise} = \tag{36}$$

$$1 \times 10^{-6}\left[\left(10^{\frac{\text{Noise Spectrum Level}}{20}}\right) \times \left(10^{\frac{10\log \text{Bandwidth}}{10}}\right)\right],$$

where:

$P_{OA}(r)$=optoacoustic pressure as a function of range;

$P_{abs}(r)$ =dimensionless loss term due to acoustic absorption in water as a function of range and frequency;

$P_{noise}$=noise pressure level with bandwidth correction;

SNR=dimensionless signal to noise ratio;

f=acoustic signal frequency; and

λ=acoustic absorption loss (dB/M).

The solution of Equation (32) with substitution of Equations (35) and (36) yields the result $$\frac{\gamma \times r}{8.7} + \ln(r) = -\ln(SNR) + \ln[P_{OA}(r)r] - \ln(P_{noise}) \tag{37}$$

This non-linear equation is optimized with respect to range through the proper choice of signal frequency and optical absorption coefficient given a value for oblique incidence angle, observation angle, signal to noise ratio (SNR), signal duration, and ambient noise. The non-linear equation can be solved numerically for a given set or sets of parameters.

Figure 8:
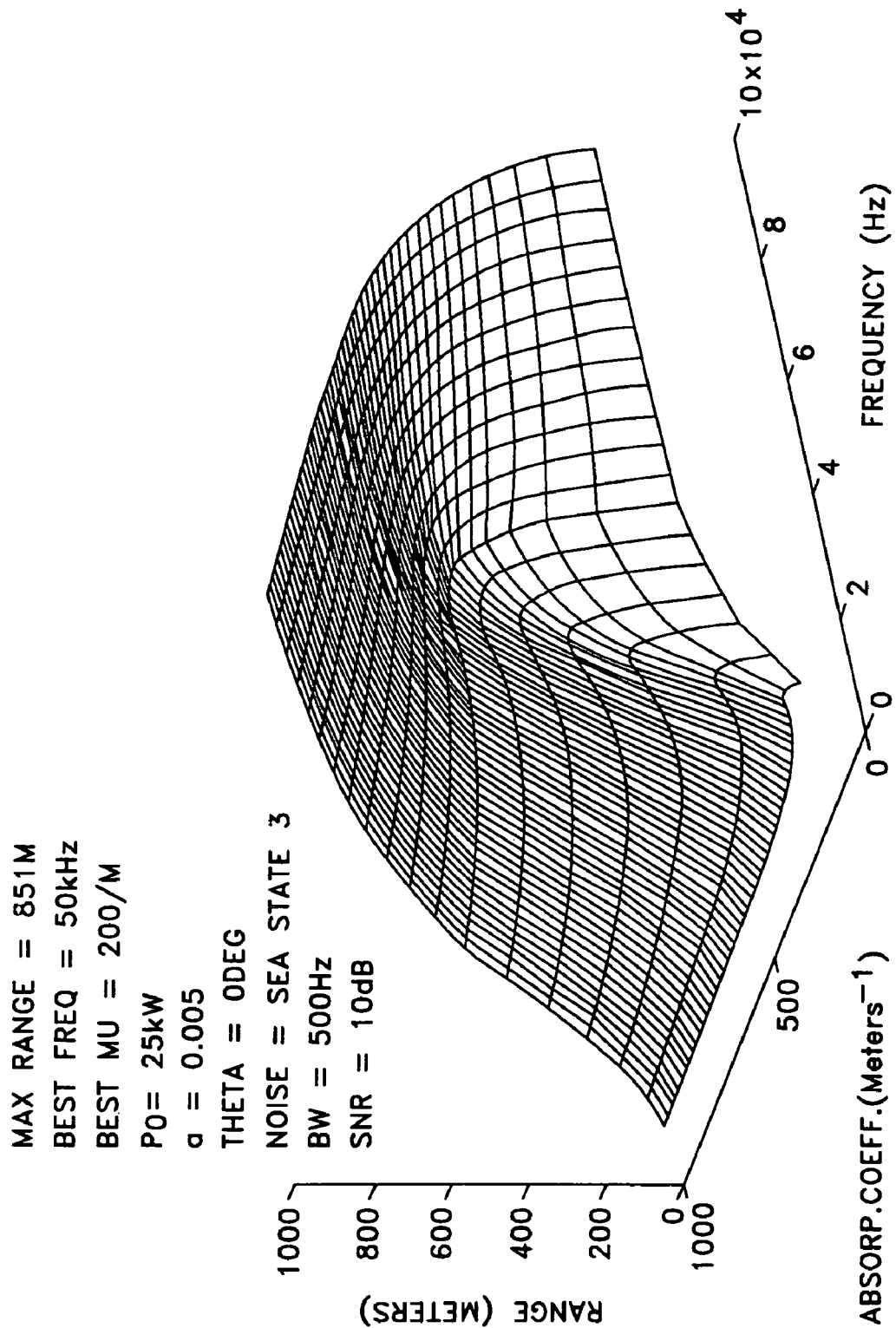
FIG. 8 depicts a mesh plot of range versus frequency and optical-absorption co-efficient for $\theta=0°$.

FIG. 8 depicts a mesh plot of range versus optical absorption coefficient versus frequency for normal incidence, a fixed observation angle of 0 degrees, SNR=10 dB, sea state 3 noise level, 500 Hz bandwidth, laser power $P_0$=25 kW, and laser beam radius a=0.005 m.

Figure 9:
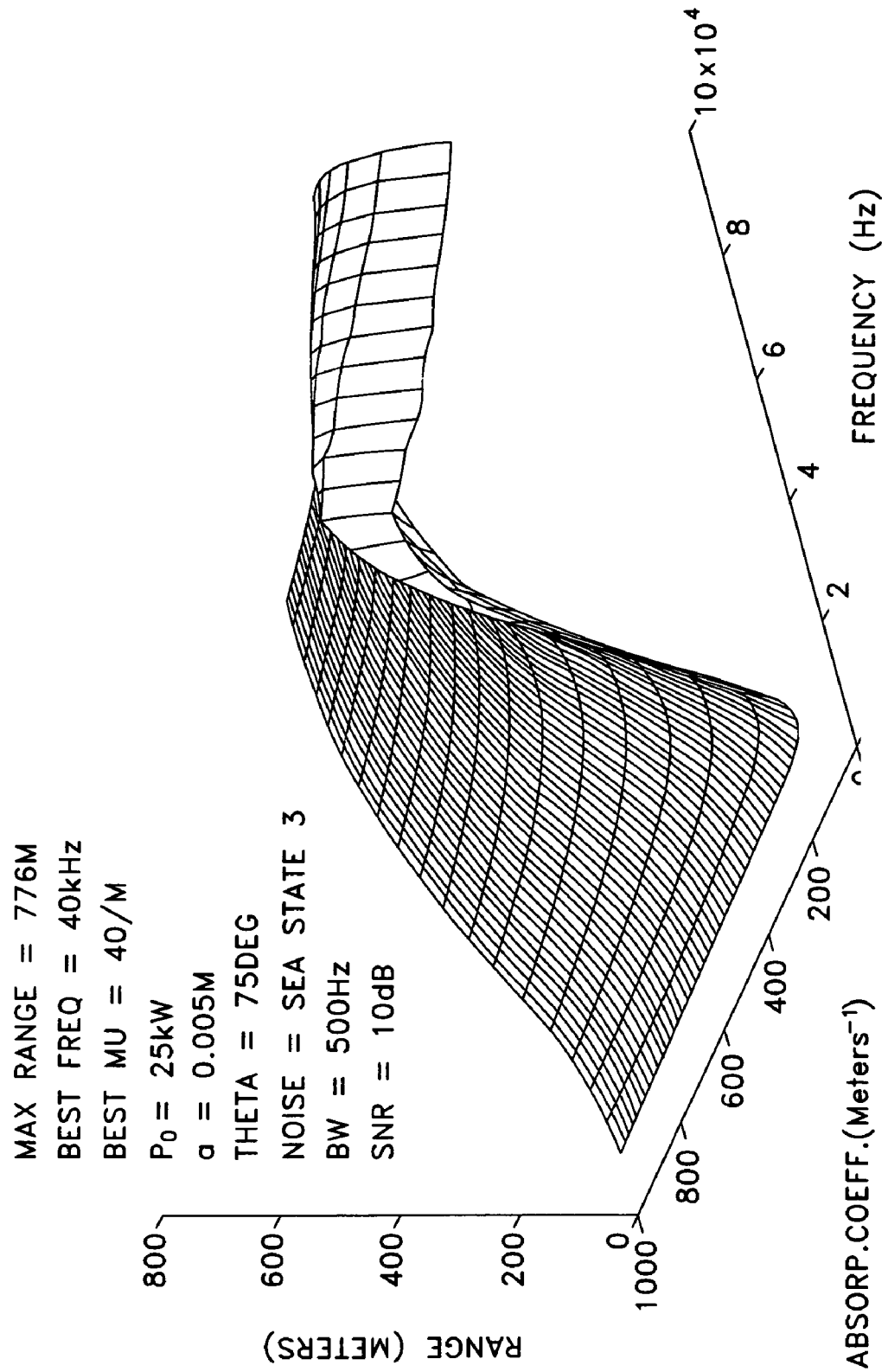
FIG. 9 depicts a mesh plot of range versus frequency and optical-absorption for $\theta=75°$.

FIG. 9. depicts another mesh plot for an observation angle of 75 degrees with all other parameters remaining constant. The figure clearly depicts an optimum frequency for transmission for each of these observation angles and for the range of the optical absorption coefficient (20-200 $m^{-1}$).

The peak of each depicted plot indicates that for a given optimum signaling frequency and a given observation angle, there is a value for the optical absorption coefficient that maximizes the range coverage. Equation (37) indicates that there is a specific but a different optimum frequency and optimum optical absorption coefficient for other observation angles, ambient noise spectra, bandwidths, SNR, laser powers, and laser beam radii.

The following trends for normal incidence in optimum frequency and optimum optical absorption coefficient with one other parameter being varied have been observed through simulation:

1. As SNR required at the receiver increases, the optimum frequency increases, the optimum optical absorption coefficient increases, and range decreases.
2. As the observation angle of the receiver is increased, the optimum frequency remains approximately the same, the optimum absorption coefficient decreases, and the range decreases.
3. As the beam radius increases, the optimum frequency decreases, the optimum optical absorption coefficient remains approximately the same, and the range decreases.
4. As noise is increased either by increasing the noise spectrum or increasing the bandwidth, the optimum frequency increases, the optimum absorption coefficient increases, and the range decreases.
5. As the laser power is increased, the optimum frequency decreases, the optimum optical absorption coefficient decreases, and the in-water range increases.

TABLE 2

Optimum Range and Parameters versus Vertical Observation Angle

| Vertical Observation Angle (Degree) | Maximum Range (Meters) | Optimum Modulation Frequency (kHz) | Optimum Optical-Absorption Coefficient (Meters) |
|---|---|---|---|
| 0 | 851 | 50 | 200 ($\lambda$ = 1310 nm) |
| 15 | 844 | 40 | 160 ($\lambda$ = 1280 nm) |
| 30 | 829 | 40 | 140 ($\lambda$ = 1240 nm) |
| 45 | 810 | 40 | 120 ($\lambda$ = 1200 nm) |
| 60 | 791 | 40 | 80 ($\lambda$ = 1175 nm) |
| 75 | 776 | 40 | 40 ($\lambda$ = 1000 nm) ($\lambda$ = 1125 nm) |

Table 2 lists the optimum frequency and optimum optical absorption coefficient as a function of observation angle for the parameters used to generate FIG. 8 and FIG. 9. The results at normal incidence relate to the optimum procedure (i.e. parameter choices for maximum range coverage using a single tonal of a given duration). The parameter optimization procedure is based on knowing the position of the receiving vehicle and having the availability of a variable wavelength, constant average power with wavelength laser source and a modulator capable of operating over the required set of frequencies.

The parameter optimization procedure is to optimize the non-linear communication range relationship in Equation (37) for a given oblique incidence angle at each vehicle vertical observation angle (the angle between the in-water receiver to the perpendicular at the water surface) and to tabulate the corresponding optimum signaling frequency and the optimum optical absorption coefficient and associated laser wavelength versus vehicle vertical observation angle in a look-up table to maximize the communication range.

However, lasers do not presently exist with comparable parameters for every selection of the optical absorption coefficient. The signaling frequency must be chosen prior to the communication and the choice must be known by the receiver. As such, it is not practical to have a system configuration that allows the transmitter to change the set of signal frequencies and the optical absorption coefficient. This practical condition provides the motivation for a suboptimum parameter selection.

B. Linear Optoacoustic Suboptimum Parameter Selection

The suboptimum parameter selection addresses a situation where a vehicle observation angle is not known and only a fixed single wavelength laser source is available. Once again, a purpose of this invention procedure is to select the optimum signaling frequency. The choice of the optical absorption coefficient should be based on a maximum range coverage constraint where the average or best choice optical absorption coefficient is based on maximum range coverage over all angles contained within the smallest and largest observation angles that can be expected due to the potential geometries of the source and the receiver. These range values can be tabulated beforehand and can be used to select the best compromise optical absorption coefficient that maximizes range over all observation angles and incidence angles of interest.

The procedure for determining the best compromise optical absorption coefficient is to compute the communication range using the non-linear optimization Equation (37) for a given oblique incidence angle and a horizontal observation angle over the range of vehicle vertical observation angles based on possible geometries (i.e. spanning 0 degrees to 90 degrees for various combinations of optical absorption coefficient and signaling frequency).

Next, sum these range values over the set of angles to obtain a range coverage metric associated with various combinations of a signal frequency and an optical absorption coefficient. Using the range coverage metrics, select the signal frequency and the optical absorption coefficient that has the largest metric; thereby, maximizing the overall in-water range coverage.

This procedure can be summarized by selecting the parameters that maximize the following relationship:

$$\text{MAX} \sum_{\theta_{min}}^{\theta_{max}} \text{range} = func(\theta_i \theta, \mu(\lambda), f, a, \text{sea state, bandwidth}) \quad (38)$$

TABLE 3

Suboptimum Range and Parameters versus Vertical Observation Angle

| Vertical Observation Angle (Degrees) | Communication Range (Meters) | Modulation Frequency (kHz) | Optical Absorption Coefficient ($m^{-1}$) |
|---|---|---|---|
| 0 | 822 | 50 | 140 |
| 15 | 819 | 50 | 140 |
| 30 | 813 | 50 | 140 |
| 45 | 800 | 50 | 140 |
| 60 | 760 | 50 | 140 |
| 75 | 622 | 50 | 140 |

Table 3 lists the suboptimum parameter communication range for normal incidence attainable using this method as a comparison to Table 2. Table 3 indicates that there is only slight degradation of range performance. However, it should be noted that a laser with this optical absorption coefficient corresponding with a 1240 nm optical wavelength does not presently exist in a high power version. Therefore, a different laser such as the Nd: Glass, 1053 nm wavelength, could be employed but with a further reduction in achievable communication range as compared to the suboptimum laser system.

important to note that the 3 dB beamwidth in all cases exceeds 40 degrees, representing a wide beampattern source.

The first entry in Table 4 is for normal incidence. The vertical observation angle is 44 degrees. There is not a horizontal in-air range obtained in this situation. However, the in-water range is 960 meters.

The next two entries are for an oblique incidence angle of 53.6 degrees which is the Brewster's angle where all incoming light is transmitted into the water. In this case, a horizontal in-air distance of 136 meters is obtained and an in-water

TABLE 4

Suboptimum Range and Angle Parameter Set

| Oblique Incidence Angle $\theta_1$ (Degrees) | Vertical Observation Angle $\theta$ (Degrees) | Horizontal Observation Angle $\phi$ (Degrees) | In-Water Range (Meters) | In-Air Range Horizontal/ Slant (Meters) | SPL (dB re µPa) | Optical Transmissivity | Main Response Axis (Degrees) | 3-dB Beamwidth (Degrees) |
|---|---|---|---|---|---|---|---|---|
| 0 | 44 | N/A | 960 | 100/100 | 140.4 | 0.98 | 44 | 72 |
| 53.6 | 0 | 0 | 965 | 136/169 | 140.5 | 1 | 0 | 53 |
| 53.6 | 26 | 90 | 970 | 136/169 | 140.6 | 1 | 26 | 67 |
| 80 | 0 | 0 | 850 | 567/576 | 138.3 | 0.75 | 0 | 44 |
| 80 | 0 | 90 | 850 | 567/576 | 138.3 | 0.75 | 0 | 63.5 |

For Table 4, the sound pressure level (SPL) is computed based on the peak level for each wave shape. Range is calculated based on a receive SNR of 10 dB, spherical spreading, acoustic absorption, noise spectrum levels for sea state 3, and noise bandwidth corrections based on the bandwidth of the wave shape (f=40 kHz and =100 m$^{-1}$).

Table 4 lists a summary of simulation results for normal and oblique incidence and lists achievable in-air, in-water, and combined communication ranges at the main response vertical observation angle, SPLs, angular parameters such as a main response axis and 3-dB acoustic beamwidth, optical absorption coefficient, and signaling frequency for a suboptimum parameter condition where the signal frequency is fixed at 40 kHz and the optical absorption coefficient is determined to be 100 m$^{-1}$ for comparison with the practical suboptimum parameters used in Table 5.

distance of 965 meters or 970 meters is obtained—depending on the vertical and horizontal observation angles.

The final two entries in Table 5 are for an oblique incidence angle of 80 degrees where 75 percent of the laser light is transmitted into the water. In this case, the in-air horizontal range is 567 meters and the in-water range is 850 meters with a vertical observation angle of 0 degrees at both horizontal observation angles of 0 degrees and 90 degrees. There is a clear advantage in overall range by employing oblique incidence at large oblique incidence angles since the in-air range from a source to a receiver is increased while minimal in-water range is lost as compared to other oblique incidence conditions as well as compared to normal incidence conditions.

In order to increase the SPL above 140 dB re 1 µPa to provide greater in-water range; a more powerful laser would

TABLE 5

Practical Suboptimum Range and Angle Parameter Set

| Oblique Incidence Angle $\theta_1$ (Degrees) | Vertical Observation Angle $\theta$ (Degrees) | Horizontal Observation Angle $\phi$ (Degrees) | In-Water Range (Meters) | In-Air Range Horizontal/ Slant (Meters) | SPL (dB re µPa) | Optical Transmissivity | Main Response Axis (Degrees) | 3-dB Beamwidth (Degrees) |
|---|---|---|---|---|---|---|---|---|
| 0 | 85 | N/A | 926 | 100/100 | 139.8 | 0.98 | 85 | 10 |
| 53.6 | 52 | 0 | 937 | 136/169 | 140 | 1 | 52 | 6 |
| 53.6 | 83 | 90 | 937 | 136/169 | 140 | 1 | 83 | 9.5 |
| 80 | 42 | 0 | 820 | 567/576 | 137.8 | 0.75 | 42 | 7.5 |
| 80 | 82 | 90 | 812 | 567/576 | 137.6 | 0.75 | 82 | 10.5 |

For Table 5, SPL is computed based on the peak level for each wave shape. Range is calculated based on a receive SNR of 10 dB, spherical spreading, acoustic absorption, noise spectrum levels for sea state 3, and the noise bandwidth corrections based on the bandwidth of the wave shape (f=40 kHz and $\mu^{Pa}$=m$^{-1}$).

The in-air platform 22 for this simulation is placed one hundred meters above the water surface 100 (See FIG. 2). It is need to be used or multiple lasers simultaneously transmitting identical signals would be required. The beam radius cannot be made independently smaller without regard to laser power since the objects of the present invention are to operate the laser system in the linear optoacoustic regime and not the non-linear optoacoustic regime.

It should be noted that a laser with a 100 m$^{-1}$ optical absorption coefficient requires a 1200 nm optical wavelength laser source which does not presently exist in a high power version. Therefore, a different more practical laser such as the Nd:Glass, 1053 nm wavelength, laser could be employed but with a further reduction in achievable communication range as compared to the suboptimum laser system.

Table 5 lists a summary of simulation results for a 1053 nm wavelength laser source with an optical absorption coefficient of 15.7 m$^{-1}$ used in conjunction with a suboptimum selection for a signaling frequency of 40 kHz for the set of simulation parameters. This parameter selection represents a practical suboptimum choice. The 3 dB beamwidth in this case is less than 11 degrees.

A more directive beam pattern is produced as compared to the simulation in Table 4. Hence, more knowledge concerning the location of the in-water receiver may be needed in order to establish the communication link. In comparison, the main response axes are all substantially larger than in Table 4 for comparable oblique incidence angles and horizontal observation angles. The in-water range obtainable in Table 5 is less than in Table 4 in all cases, differing by as much as 4.5 percent. The reason for these undesirable effects is the employment of a laser system that is suboptimum in a practical sense as compared to the theoretical suboptimum laser system and the parameters of the suboptimum laser system.

C. Comparison of Communication Techniques

Once the signaling center frequency and the optical absorption coefficient have been selected according to the optimum, suboptimum, or practical suboptimum procedure; a communication signaling approach must be chosen to produce a desired data rate. Multipath rejection is also desirable for underwater communications. M-ary FSK signaling with symbol spacing selected to mitigate intersymbol interference is a robust method for underwater acoustic communication. This method can be attained using multiple long pulse lasers, modulators, frequency/laser/symbol assignment and laser firing rates. The laser firing rate determines the temporal guard bands used to mitigate multipath-induced inter-signal interference.

The simplest form of a FSK communication scheme is to employ a single laser to represent a single bit with one modulation frequency assigned to a bit=1 condition and another modulation frequency assigned to a bit=0 condition where both modulation frequencies are centered around the optimum center frequency.

Figure 10:
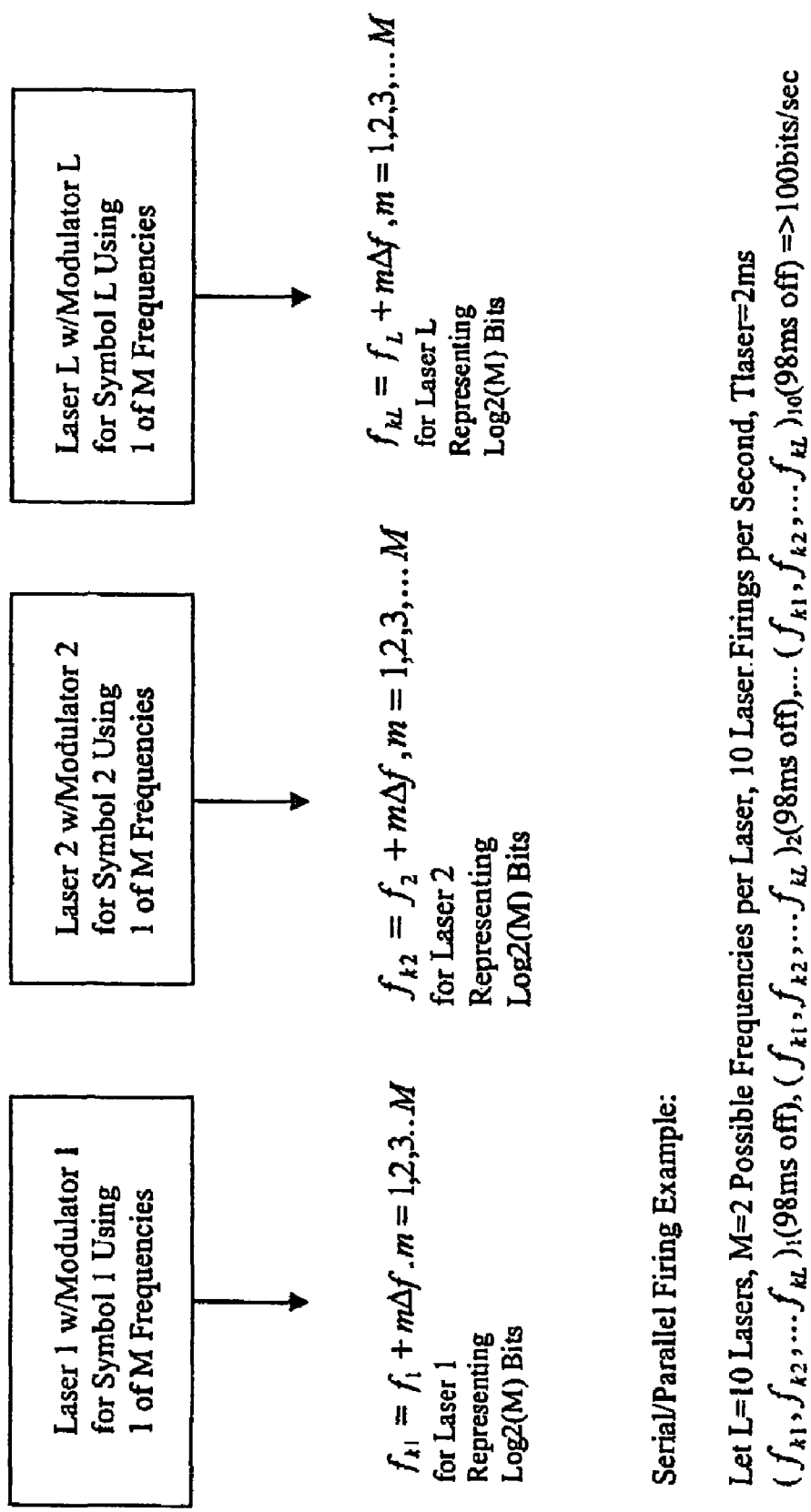
FIG. 10 depicts a frequency shift keying (FSK) linear optoacoustic communication scheme.

For example, with a laser firing rate of 10 times per second for each laser, a 2 ms signal duration, and 10 lasers, it is possible to generate a data rate of 100 bits/s with a bandwidth of 10 kHz with the lasers firing sequentially or in parallel. This linear optoacoustic communication scheme is depicted in FIG. 10. The acoustic amplitude of this communication scheme can be increased by replacing each laser with multiple, synchronized lasers that each produce an identical signal. Undesirable features of this communication scheme are the number of lasers required, the low data rate and the bandwidth required.

Another communication scheme for consideration is 4—FSK. In this configuration, each laser produces one of four frequencies in which each frequency represents a unique combination of two bits. In order to obtain a data rate of 100 bits/s as in the 2—FSK case, five lasers would be required given the same signal duration and laser firing rate. The number of lasers has been reduced by half and the bandwidth required remains at 10 kHz. Based on these parameters, the 4—FSK communication scheme is a better choice than the 2—FSK communication scheme due to the reduction in the number of lasers with all other parameters being identical.

A number of permutations may be considered to further reduce the number of lasers and modulators; to decrease the bandwidth required; and to increase the data rate. A higher order FSK communication scheme could be used to reduce the number of lasers and to increase the data rate; however, the bandwidth required would increase non-linearly with data rate leading to optoacoustic conversion inefficiencies and the inefficient use of bandwidth. The signal length could be increased in order to reduce the bandwidth requirements in any of these systems; however, the laser power would need to be reduced to produce a longer laser pulse duration which would result in a decrease in range coverage. An increase in the laser firing rate would increase the data rate in any of these systems but at the expense of degrading multipath rejection and lowering the generated acoustic signal level. In this case, forward error correction coding would be required to mitigate multipath induced errors.

An alternative modulation scheme to FSK modulation is MFSK modulation. In MFSK modulation, multiple frequencies can be transmitted simultaneously during a laser pulse (i.e. a signal interval). The benefit of the MFSK modulation scheme is to increase the overall data rate by increasing the number of bits transmitted per laser pulse.

The MFSK modulation scheme is a more bandwidth efficient approach and requires less bandwidth than the M-ary FSK approach when on/off keying is used. By on/off keying, it is meant that when a bit in a particular position is a binary one, the assigned frequency is transmitted. Conversely when the bit in a particular position is a binary zero, the assigned frequency is not transmitted. However, using the MFSK modulation scheme reduces the SPL for each tone since the laser energy and acoustic energy is being divided into multiple, simultaneous tonal locations as compared to the 4-ary FSK approach. As an example, consider sending two frequencies (2 frequency MFSK) per laser pulse. In this case, the bandwidth used is 1 kHz with a data rate of 40 bits/s since each laser pulse can now send 4 bits per pulse. This represents an increase in data rate of a factor of two compared to the 4-ary FSK system and a decrease in bandwidth by a factor of two.

TABLE 6

M-ary FSK versus MFSK Modulation Comparison

| Modulation Method | Data Rate Bits/s | Bandwidth (kHz) | SPL (dB re 1µ Pa) | In-Water Range (Meters) |
|---|---|---|---|---|
| 2-ary FSK | 10 | 1 | 137 | 800 |
| 4-ary FSK | 20 | 2 | 137 | 800 |
| 8-ary FSK | 30 | 4 | 137 | 800 |
| 16-ary FSK | 40 | 8 | 137 | 800 |
| 1-MFSK | 10 | 0.5 | 137 | 800 |
| 2-MFSK | 40 | 1 | 131 | 517 |
| 3-MFSK | 80 | 1.5 | 128 | 410 |
| 4-NFSK | 160 | 2 | 125 | 320 |

Simulation for Table 6 is based on $f$=40 kHz and $\mu$=15.7 m$^{-1}$ and the last two entries in Table 5.

Table 6 lists a comparison of modulation involving both M-ary FSK and MFSK with associated data rates, bandwidths, and in-water communication ranges. A SPL of 137 dB re 1 µPa is used as the starting point for in-water range calculations. This value represents the worst case SPL obtained from the practical suboptimum laser system simulation tabulated in Table 5.

For comparable data rates, the MFSK method uses less bandwidth by at least a factor of two than the M-ary FSK method. The SPL and in-water range decreases as the number of simultaneous tones within a given laser pulse increases. In the 16-ary FSK case, a bandwidth of 8 kHz is used to provide a data rate of 40 bits/s at full SPL over each laser pulse. As a comparison, 4-MFSK requires a bandwidth of 2 kHz and provides a data rate of 160 bits. However, instead of the 137 dB re 1 μPa SPL, a reduced SPL of 125 dB re 1 Pa is obtained since the laser energy must be divided by a factor of four in the worst case when four frequencies are transmitted within a laser pulse. This produces an in-water range reduction from 800 meters in the 16-ary FSK case to 320 meters which represents more than a factor of two reduction in range. Therefore, in-water range must be exchanged for data rate when MFSK modulation is employed. The choice of a modulation system must be based on the particular data rate and in-water range requirement for a given application.

SUMMARY

The linear optoacoustic generation process can be employed for communication applications when the in-water communication range is within roughly a kilometer based on the simulation parameters presented. Oblique laser beam incidence provides a method to obtain increased horizontal in-air range from the laser source to the in-water receiver and also provides a method to control the in-water acoustic beam-pattern.

The optimized in-water range coverage can be obtained by optimizing the signal frequency and the optical absorption coefficient for the particular conditions under consideration. The communication range may be increased under lower sea state conditions and/or with an increase in laser power.

Using optimized suboptimum parameter choices for a signal frequency and an optical absorption coefficient result in a wider beampattern as compared to the practical suboptimum parameter choices for signal frequency and optical absorption coefficient. The use of MFSK modulation can reduce the communication bandwidth as compared to M-ary FSK modulation.

In addition, the data rate can be increased in the case of MFSK modulation as compared to M-ary FSK modulation. However, the tradeoff is a reduction in SPL and in-water range by a factor that corresponds to the number of simultaneous frequencies that are generated during any given laser pulse. The acoustic signal level, data rate, and acoustic beam-pattern can be controlled through the appropriate use of multiple lasers that are properly spaced and time multiplexed. These lasers can be used to produce an increased signal level; to increase a data rate and can control the acoustic beam pattern.

The advantage of this communication scheme is that given fixed or measurable sea conditions, SNR, bandwidth, and signaling frequency, the optimum solution to increase in-water range is to vary laser wavelength (i.e., for the optical absorption coefficient) as a function of vehicle geometry (i.e., for observation angle). Also, a suboptimum method involves a single laser wavelength chosen by picking the wavelength/ signaling frequency combination that maximizes range over the in-water vehicle/sensor geometry of interest (i.e., for allowable observation angles).

The foregoing description of the preferred embodiments of the invention has been presented for purposes of illustration and description only. It is neither intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for optimizing linear optoacoustic communication from an in-air platform to an undersea receiver, said method comprising the steps of:
    utilizing at least one laser beam containing a communications signal;
    firing a first collection of lasers with the at least one laser beam from the in-air platform to a water medium with the at least one laser beam capable of being optically absorbed within the water medium with an identifiable optical absorption coefficient;
    identifying waveshape data and a sound pressure level with the undersea receiver;
    determining a communication in-water range of the at least one laser beam based upon the identified sound pressure level and identified waveshape data;
    increasing the power of the at least one laser based upon the determined communication in-water range; and
    varying a signal frequency relative to said increasing power step of the at least one laser beam based upon the identification of the optical absorption coefficient and the determined communication in-water range in order to determine a suitable signal frequency and power level coincident to a suitable in-water range required for optimized linear optoacoustic communication.

2. The method in accordance with claim 1, said method further comprising the steps of:
    firing the at least one laser beam of the first collection of lasers at an oblique angle from the in-air platform to the water medium;
    identifying the optical absorption coefficient subsequent to said step of firing the at least one laser beam at the oblique angle; and
    adjusting the oblique angle of the at least one laser beam for an optimum optical absorption coefficient and an optimum in-air range by optimizing a range relationship by the equation $$\frac{\gamma \times r}{8.7} + \ln(r) = -\ln(SNR) + \ln[P_{OA}(r)r] - \ln(P_{noise})$$

for a given oblique incidence angle at each vehicle vertical observation angle and tabulating the corresponding optimum signaling frequency and the optimum optical absorption coefficient and associated laser wavelength versus vehicle vertical observation angle.

3. The method in accordance with claim 2 wherein the at least one laser beam is a long pulse duration beam of at least one millisecond with said method further comprising the steps of:
    modulating the at least one laser beam to a M-ary frequency shift keying signaling manner; and
    adjusting a communication in-water range capability for the linear optoacoustic communication by said modulating step of the at least one laser beam based on said sound pressure level identification step.

4. The method in accordance with claim 3 wherein the at least one laser beam controls the acoustic signal level of the linear optoacoustic communication and with said method comprising the further steps of:
    firing a second collection of lasers with at least one long pulse duration laser beam of at least one millisecond from the in-air platform to wherein the at least one laser beam of the second collection of lasers controls a data rate of the linear optoacoustic communication;

identifying an optical absorption coefficient of the at least one laser beam of the second collection of lasers;

modulating the at least one laser beam of the second collection of lasers to a multi-frequency shift keying signal to optimize data rate based on the identified optical absorption coefficient of the at least one laser beam of the second collection of lasers; and modulating the at least one laser beam of the first collection of lasers based on the identified optical absorption coefficient of the at least one laser beam of the first collection of lasers to optimize the acoustic signal level.

5. The method in accordance with claim 4, said method further comprising the steps of:

varying an incidence angle of the at least one laser beam of the first collection of lasers on the water medium and an incidence angle of the at least one laser beam of the second collection of lasers on the water medium;

measuring the incidence angle of the at least one laser beam of the first collection of lasers on the water medium and the incidence angle of the at least one laser beam of the second collection of lasers on the water medium;

determining a surface tilt factor based upon the measured incidence angles, the optical absorption coefficient, determined communication in-water range of the at least one laser beam of the first collection of lasers and the at least one laser beam of the second collection of lasers and the frequency of the at least one laser beam of the first collection of lasers and the at least one laser beam of the second collection of lasers; and mitigating the surface tilt factor by varying a beam width of the at least one laser beam of the first collection of lasers and the at least one laser beam of the second collection of lasers thereby optimizing the linear optoacoustic communication.

6. The method in accordance with claim 5, said method further comprising the steps of:

measuring a signal to noise ratio within the water medium; and varying the signal frequency of the at least one laser beam of the first collection of lasers and the at least one laser beam of the second collection of lasers to optimize the signal to noise ratio thereby optimizing the in-water range of the laser beams.

7. The method in accordance with claim 6, said method comprising the further step of:

firing a third collection of lasers with at least one long pulse duration laser beam of at least one millisecond from the in-air platform to the water medium wherein the at least one laser beam of the third collection of lasers and spacing relative to the first and second collection of lasers controls an acoustic beam pattern of the linear optoacoustic communication.

8. The method in accordance with claim 7, said method further comprising the further steps of:

determining a compromise optical absorption coefficient value for in-water communication range for a given oblique incidence angle and a horizontal incidence angle by using an equation $$\frac{\gamma \times r}{8.7} + \ln(r) = -\ln(SNR) + \ln[P_{OA}(r)r] - \ln(P_{noise});$$

summing the range values over a range of vertical observation angles of the undersea receiver to a surface of the water medium;

obtaining a range coverage metric associated with various combinations of the signal frequency and the optical absorption coefficient of the at least one laser beam of the first collection of lasers; and selecting a frequency and optical absorption coefficient with the largest metric thereby maximizing overall in-water coverage by the equation.

\* \* \* \* \*